United States Patent [19]

Schilling et al.

[11] 4,391,496
[45] Jul. 5, 1983

[54] ADJUSTMENT DEVICE FOR A PANCRATIC OBJECTIVE OF A STEREOMICROSCOPE

[75] Inventors: Albert Schilling, Aalen; Wolfgang Schob, Oberkochen, both of Fed. Rep. of Germany

[73] Assignee: Carl Zeiss-Stiftung, Oberkochen, Fed. Rep. of Germany

[21] Appl. No.: 229,194

[22] Filed: Jan. 28, 1981

[30] Foreign Application Priority Data

Feb. 12, 1980 [DE] Fed. Rep. of Germany ... 8003643[U]

[51] Int. Cl.³ ............................................. G02B 15/16
[52] U.S. Cl. ..................................... 350/519; 350/255
[58] Field of Search .................... 350/44, 427, 255, 36, 350/518, 519, 554, 555, 556

[56] References Cited

U.S. PATENT DOCUMENTS

| 3,028,791 | 4/1962 | Clark et al. | 350/44 |
| 3,028,792 | 4/1962 | Krajowsky et al. | 350/44 |
| 3,185,029 | 5/1965 | Peck et al. | 350/427 |
| 3,405,991 | 10/1968 | Seedhouse | 350/36 |
| 3,445,155 | 5/1969 | Starrock | 350/255 |
| 3,480,349 | 11/1969 | Himmelsbach | 350/255 X |
| 3,533,344 | 10/1970 | Thomas | 350/44 |
| 3,550,518 | 12/1970 | Himmelsbach et al. | 350/44 |
| 3,840,291 | 10/1974 | Littmann et al. | 350/36 X |
| 3,879,107 | 4/1975 | Chaban | 350/36 X |

Primary Examiner—John K. Corbin
Assistant Examiner—Matthew W. Koren
Attorney, Agent, or Firm—Hopgood, Calimafde, Kalil, Blaustein & Judlowe

[57] ABSTRACT

The invention contemplates adjustment mechanism for a pancratic objective, wherein each of two differently displaceable lens holders are nevertheless correctly driven by a single manual driving rotation, there being a variable-length corrective connection between the respective lens holders, and there being means operated upon manual adjustment of one holder for correctively varying the length of the connection to the other lens holder.

4 Claims, 4 Drawing Figures

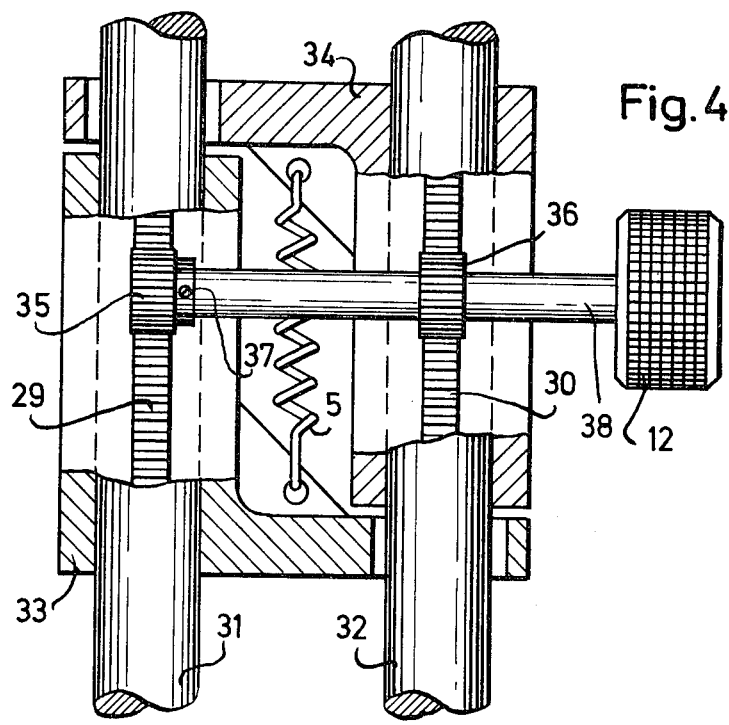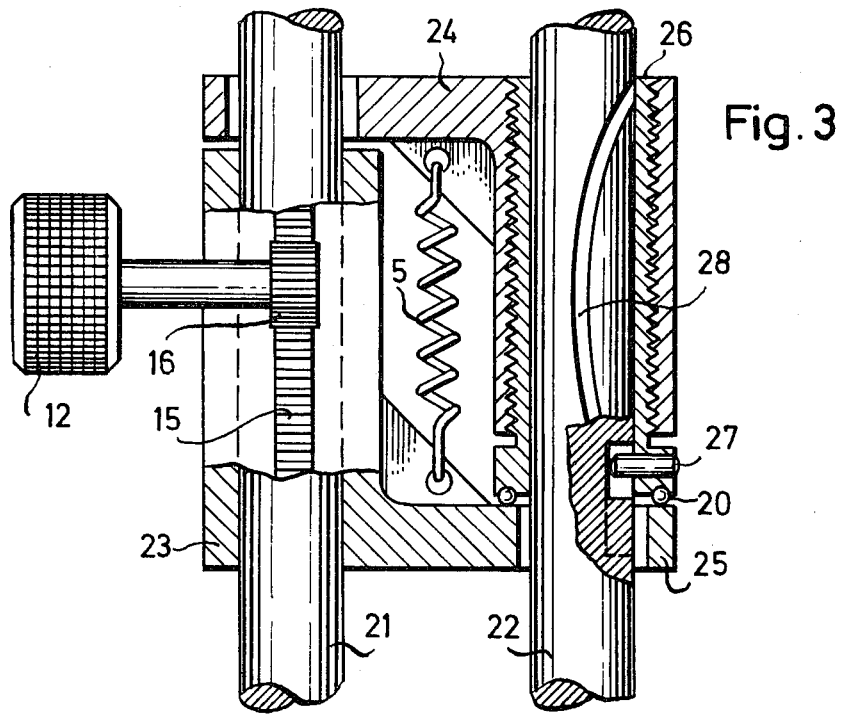

ADJUSTMENT DEVICE FOR A PANCRATIC OBJECTIVE OF A STEREOMICROSCOPE

BACKGROUND OF THE INVENTION

The present invention relates to means for adjustably setting a pancratic objective having two lens members which are displaceable along the optical axis, the specific context being such an objective for a stereomicroscope. Two lens members subject to different courses of motion are always required in objectives of variable magnification if the focal plane is to be maintained constant during an adjustment of focus.

Known adjusting devices for zoom lenses of stereomicroscopes, such as described, for instance, in published West German Application No. 21 54 977 (Offenlegungsschrift), U.S. Pat. No. 3,502,392 or West German Gebrauchsmuster No. 7,210,832, have a cam cylinder or cam disk which is directly driven by a handle and which has two different cam curves for displacement of the movable lens members with respect to the fixed optical elements and with respect to each other, in accordance with courses of motion which can be calculated in advance. The manufacture of such drives is relatively expensive since two cam curves must be milled with high precision in a well-defined relationship to each other.

BRIEF STATEMENT OF THE INVENTION

The object of the present invention is to provide, for pancratic objectives in which two lens members are displaced differently but in substantially the same direction parallel to the optical axis, an adjustment device which, while of low cost of manufacture and simple adjustment, enables accurate displacement of the movable lens members relative to each other. The invention in a preferred form achieves this object by employing a cam-controlled variable-length hinged linkage between the holder for the first lens member and the holder for the second lens member, so that upon manual displacement of the first lens member, the second lens member will be concurrently displaced but to a predetermined cam-controlled extent which differs from the manual displacement of the first lens member.

The advantage obtained by the invention lies in simplified construction, as compared with the prior art. One solution of the invention requires only a single cam curve, since instead of two directly driven lens groups, a hinge element is employed to transmit longitudinal movement of the manually driven lens member to the second lens member, with a superimposed corrective displacement obtained from the cam curve, so that the second lens member is thus driven indirectly. The cam curve can be arranged in easily adjustable manner on the stationary part of the adjusting device; it permits both step-up and step-down corrective movements of the indirectly driven lens member. Since the corrective movements between the displaceable lens members are obtained directly from a cam curve and do not result as the difference between two independent courses of motion, manufacturing tolerances have only a slight influence on the accuracy of the adjustment.

Another solution of the invention does not require any cam curve at all. Both holders for the displaceable lens members are, rather, driven directly in each case by rack-and-pinion means coupled to a rotary knob. At least one of the racks has a length-dependent pitch error, as a result of which the driven lens members are displaced relative to each other in accordance with the required corrective motion. With such nonlinear racks, which can be produced at low cost in large numbers, it is possible, to be sure, only to carry out slight corrective movements but these movements are entirely sufficient for optical systems which have been suitably designed.

DETAILED DESCRIPTION

Three particularly advantageous embodiments of the present invention will be described with reference to the accompanying drawings, in which:

FIG. 3 is a partial sectional view, as in FIG. 1, to show a second embodiment; and FIG. 4 is a similar partial sectional view of the third embodiment.

Figure 1:
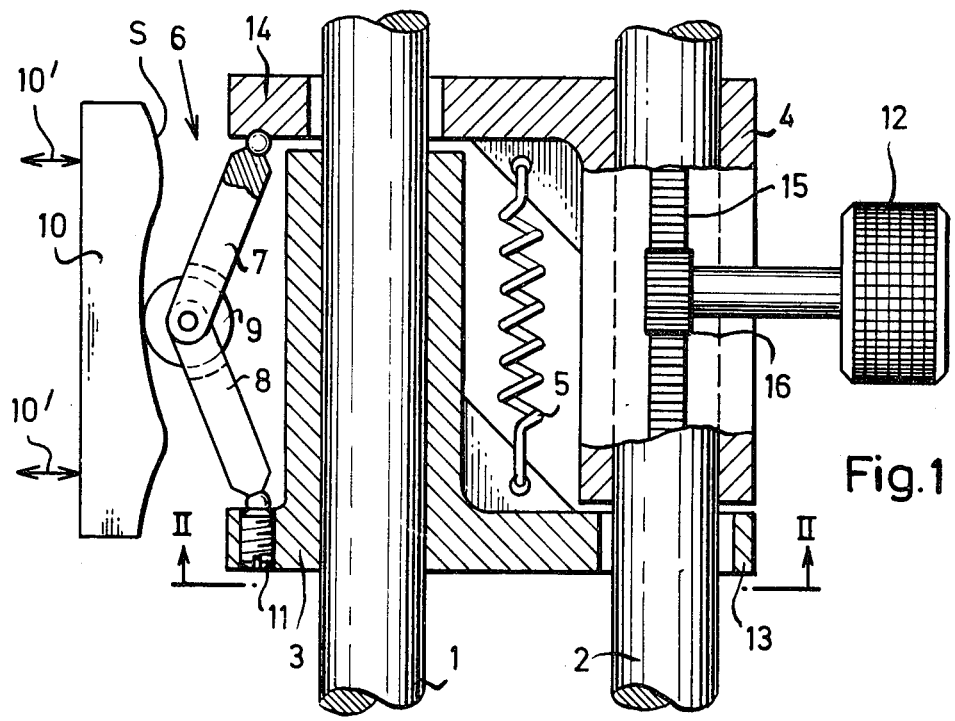
FIG. 1 is a partial section through the adjustment device for a zoom objective lens of a stereomicroscope, the section being taken parallel to the plane of the optical axes of the objective.
Figure 2:
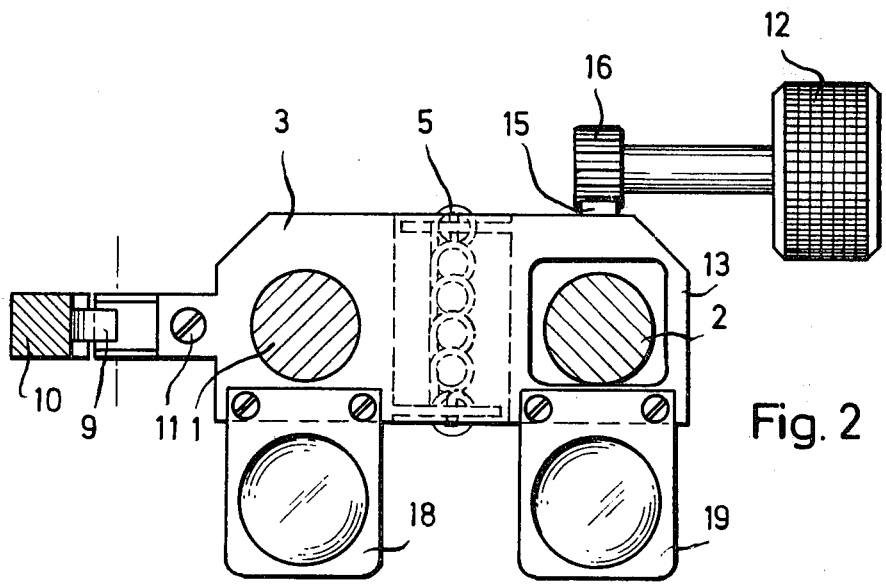
FIG. 2 is a transverse section, taken along the line II—II of FIG. 1.

The adjustment device shown diagrammatically in FIGS. 1 and 2 consists of two cylindrical guide rods 1 and 2 which are fixedly supported parallel to each other, the fixed support deriving from housing structure (not shown); holders 3 and 4 for the respective lens members to be displaced are slidably guided on rods 1 and 2. The holder 4 is driven directly by an adjustment knob 12 via a pinion 16 and a rack 15 fastened to the holder 3.

The holders 3 and 4 are secured against rotation by radially projecting arms 13 and 14 which are applied in each case against the guide rod of the other holder by a spring 5 which is installed obliquely to the direction of displacement. At the same time, spring 5 serves to urge holders 3 and 4 toward each other in direction of displacement.

In the plane of the guide rods 1 and 2, on the stationary housing (not shown) of the adjustment device, there is fastened a plate 10 which is provided with a curved cam profile S. A variable-length elbow linkage 6, consisting of two pivotally connected arms 7 and 8, carries a cam-follower roll 9 on the pivot axis; and, as spring 5 constantly urges holders toward each other, the two arms 7 and 8 of the elbow linkage (via ball contact with the respective holders 3 and 4) drive the roll 9 into tracking contact with the cam 10.

By means of a ball-mounting set screw 11, via which arm 8 of the elbow linkage 6 engages holder 3, the distance between the two holders 3 and 4 can be changed without changing the elbow angle; therefore, the transformation ratio is not changed, for transmission of corrective displacements from cam S to the holder 3. In order to adjust the elbow angle, which determines the transformation ratio, the mounting of cam plate 10 to the housing can be adjustable in the sense perpendicular to the optical axis, as schematically suggested by double arrows 10'.

Upon operation of the adjustment device by rotation of knob 12 (which is arranged laterally on the stereomicroscope and therefore can be conveniently manually operated by the user), the directly driven holder 4 carries the holder 3 along with it, via the elbow linkage 6, the holder 3 being acted on by spring 5, free of play. Upon axial displacement (i.e., along the optical axis) of the lens members fastened to the holders (e.g., lenses 18–19 carried by holder 3), the focal length of the involved objective system is changed. The supplementary movement applicable to the lens members (not shown) carried by holder 4, being obtained via the cam-following elbow linkage 6, and being superimposed on the direct displacement movement of lens members 18 and 19 (which are displaced simultaneously and which serve the respective optical channels of the stereomicroscope), assures maintenance of a constant image plane regardless of focusing adjustment.

In the embodiment described, relatively large corrective movements can be obtained, via an easily mounted elbow-linkage subassembly, which is inserted in simple manner into its supporting mounts, and via cam structure 10 which is also very easy to manufacture. The latter can, for instance, be developed as a stamping or as a die casting.

The embodiment shown diagrammatically in FIG. 3 is of similar construction but permits corrective movements and is of a more compact overall construction.

A lens holder 23 which is also directly knob driven via pinion 16 and rack 15, slides on the guide rod 21. A sleeve 26 forming part of the second lens holder is rotatably supported and displaceable on the guide rod 22 and rests, via a pivot bearing 20, on the arm 25 (of holder 23) which surrounds the second guide rod 22. Sleeve 26 carries a follower pin 27 which engages in a cam groove 28 in the guide rod 22; sleeve 26 is in threaded engagement with the second holder 24. Upon the displacement of the holder 23, the sleeve is thus caused to rotate, and by reason of the threaded engagement with the holder 24, this cam-derived sleeve rotation is transmitted as additional corrective movement to the latter. The adjusting of the desired distance between the holders 23 and 24 is effected in simple manner by initially rotating the guide rod 22 and by then clamping it in its fixed connection to the housing (not shown).

FIG. 4 diagrammatically shows an embodiment which is characterized by very low cost of manufacture. Both holders 33 and 34, which are displaceable along the guide cylinders 31 and 32, are driven directly by the setting knob 12 via pinions 35 and 36 and racks 29 and 30, respectively. One or both racks 29 and 30, which are fastened to the holders, have a length-dependent pitch error which is so selected that in combination with the corresponding pinion, the desired corrective movement of the two holders 33 and 34 relative to each other, is obtained. Such racks with pitch error can be manufactured in large quantities at favorable price with a single setting of the tool used for their production.

If the relative movement of the two holders 33 and 34 is small as compared with their joint longitudinal movement with respect to the stationary optical elements of the pancratic objective, pitch errors do not have a negative effect on the quietness of operation of the support in question. This situation is particularly commonplace and can always be obtained by a suitable design of the optical system.

To enable adjustment of the distance between the two holders of FIG. 4, one of the two pinions is mounted for adjustable rotation on the common drive shaft 38 and is secured by a clamping set screw 37.

What is claimed is:

1. An adjustment device for pancratic objectives, particularly for stereomicroscopes, comprising:
   first and second lens group holders, said first and second holders being displaceable differing amounts in the same direction along the optical axis of said objectives;
   a variable-length connecting element coupling said first and second holders, said connecting element including a first arm pivotally joined to said first holder, a second arm pivotally joined to said second holder, said first and second arms being pivotally joined to each other to form a pivot point;
   cam follower means disposed at said pivot point of said arms;
   external cam means disposed for engagement with said cam follower means;
   means for biasing said first and second holders together and to bias said cam follower means into engagement with said cam means; and
   means for displacing at least one of said first and second holders along said optical axis.

2. The adjustment device as claimed in claim 1 wherein said first holder includes means for varying the point at which said first arm is pivotally joined to said first holder.

3. The adjustment device as claimed in claim 1 further including:
   first and second parallel guide rods, said first and second holders being in slideable engagement with the respective one of said first and second guide rods;
   said first and second holders including first and second guide members extending radially with respect to said guide rod to which said holder is slideably mounted, said first and second guide members being disposed respectively above and below the center line of said guide rods; and
   said biasing means being disposed between said guide members to bias said first and second holders together and to prevent rotation of said holders about said guide rods.

4. The adjustment device claimed in claim 1 wherein said means for displacing at least one of said holders comprises rack means disposed on at least one of said first and second holders, and manually rotable pinion means engaging said rack.

* * * * *